E. G. OTIS.
Bake Oven.
2 Sheets—Sheet 1.
No. 21,271.
Patented Aug. 24, 1858.
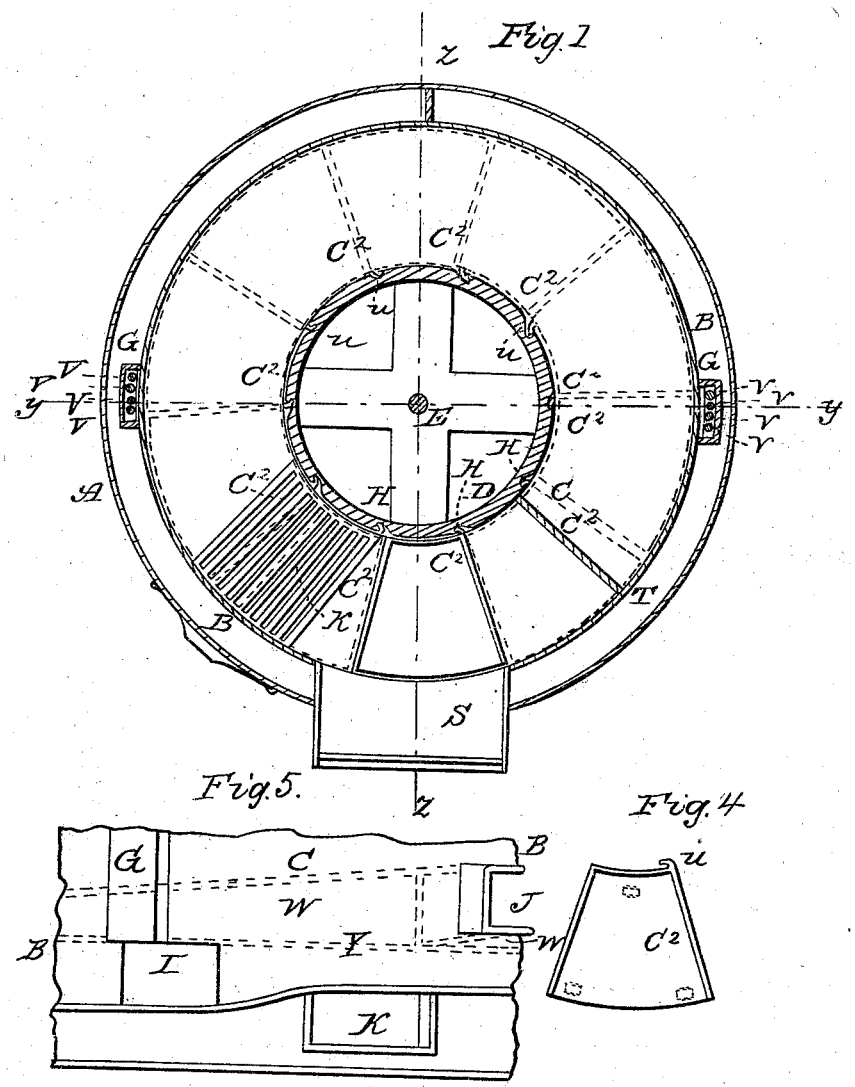

E. G. OTIS.
Bake Oven.
No. 21,271.
2 Sheets—Sheet 2.
Patented Aug. 24, 1858.
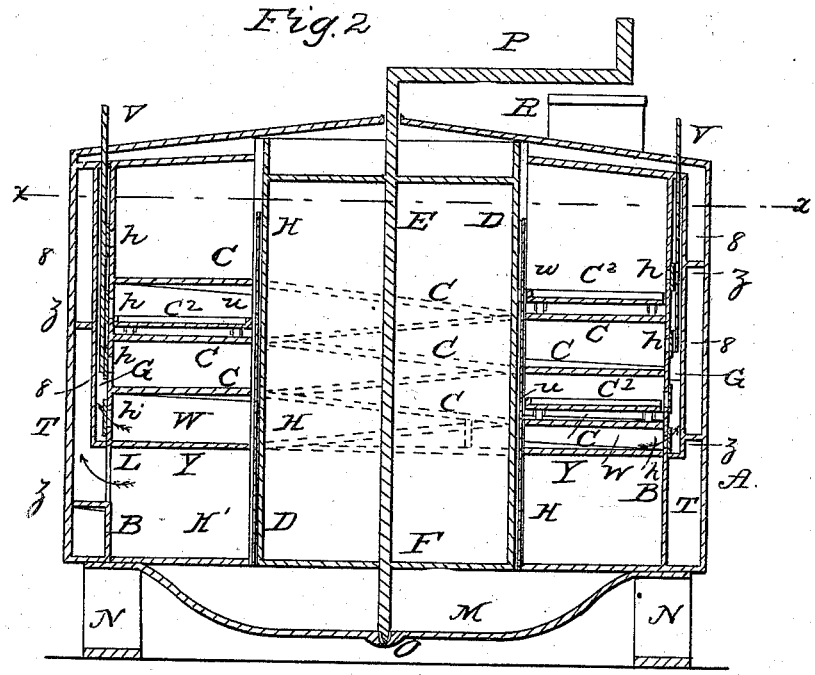
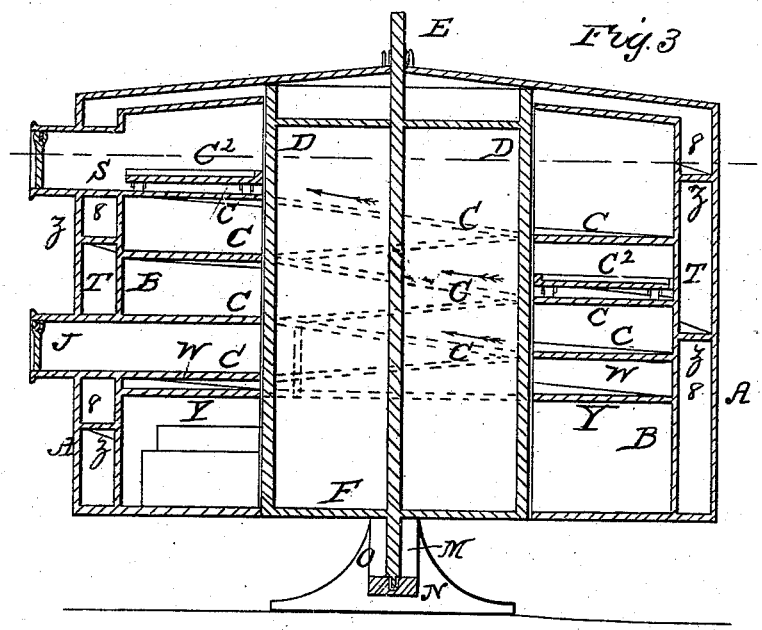

UNITED STATES PATENT OFFICE.

E. GRAVES OTIS, OF YONKERS, NEW YORK.

OVEN.

Specification of Letters Patent No. 21,271, dated August 24, 1858.

*To all whom it may concern:*

Be it known that I, E. GRAVES OTIS, of Yonkers, in the county of Westchester and State of New York, have invented a new and Improved Oven for Baking; and I do hereby declare that the following is a full, clear, and exact description of the same, reference being had to the annexed drawings, making part of this specification, in which—

Figure 1 is a horizontal section of oven on line $x$ $x$. Fig. 2 is a vertical section of oven on line $y$ $y$. Fig. 3 is a vertical section of oven on line $z$ $z$. Fig. 4 is a top view of bread car. Fig. 5 is a elevation of a portion of inner wall B, showing position of furnace, discharge opening from furnace and position of hot air in chamber.

Similar characters of reference in the several figures denote the same part.

This improvement consists in the employment or use of a spiral track in an oven for the purpose of carrying dough or other material several times around the periphery of an oven during the process of baking—as from J to S, or the reverse from S, to J, whereby a great amount of dough or other material can be baked in a short time.

To enable those skilled in the art to understand and construct my invention I will proceed to describe it.

A represents a circular outside shell or covering to the oven which may be made of brick, iron, or other material.

B is the inside shell next to the spiral track. This also may be made of brick, iron, or such other materials as may be found preferable.

T is an open space between the shells A, and B, for the purpose of forming flues to conduct the heat and smoke from the furnace K around the oven and discharge it through smoke pipe R.

C represents the spiral track winding from J, up to S, after passing three times around the oven.

$C^2$ $C^2$ $C^2$ represent cars on the spiral track.

D represents an upright cylinder with parallel vertical grooves H, H, H, H, H, H, H, H, for the purpose of receiving the hooks U, U, on the cars $C^2$ $C^2$ $C^2$ &c., and carrying them around by means of power applied to the crank P, or by means of steam or other power applied to the shaft E, in any suitable manner either above or below the oven.

F is the face plates or bottom of cylinder D and receives through its center the shaft E to which it is firmly keyed and secured.

G represents pipes or flues for conducting hot air from the hot air chamber W, W, up the sides of the oven and discharging it into the oven through any of the openings $h$, $h$, $h$, $h$, which may be opened or closed at pleasure by means of the dampers attached to the rods V, V.

The spiral tracks C, C, are made double and filled between with alum, plaster, or other nonconductor to prevent the heat ascending too rapidly.

The shells A, and B, extend over the top of the oven leaving space same as at sides for heat and smoke.

M, is a bracket to support the step O, in which the shaft E rests. Z Z Z are spiral partitions between the flues $g$, $g$.

N, N, are supports on which the oven stands.

Y, Y, are horizontal plates of metal or arches of brick over the fire in its first passage around the oven and separates the fire from the hot air chamber W, W.

J, and S, are doors hinged at top and closing by their own weight.

The operation of this oven is as follows: Fire being kindled in the furnace K the heat passes to the right entirely around the cylinder under the plates Y,Y, to L, where it passes through the shell B into the space T and then again passes entirely around the oven and is finally discharged through the top of the oven at R. The proper temperature or variation of temperature being secured in the different parts of the oven by means of the dampers on rods V, V, the dough is placed on a car $C^2$, and the car passed into the oven at J and being attached to the groove in the cylinder by the hook $u$, the cylinder is turned by hand or other means one eighth of a revolution when it stops to receive another car of dough, and then again moves one eighth revolution as before; when this operation has been repeated twenty four times, the first car (having made three revolutions around the oven) will appear at the top of the track at S, with its load of dough thoroughly baked, ready to be discharged and refilled with dough, and enter again at the bottom of the track at J, after which the operation will be continuous for any desired length of time.

The cars C² are made to fill the spiral space between the tracks C, C, to prevent the hot air from ascending too rapidly.

I am ware of the use of spiral flues in hot air furnaces and do not wish to be considered as claiming such; but What I do claim as new and desire to secure by Letters Patent, is—

1. The construction of ovens with the floor upon which the baking takes place running spirally around the inside of the oven, substantially as herein set forth.

2. The rotary cylinder D, constructed, arranged and operating, substantially as and for the purposes set forth.

3. Placing the spiral chamber in which the baking is performed in communication with the hot air chamber W, above the fire chamber, by means of the chambers G, and the openings controlled by the dampers $h$, for the purpose of regulating the temperature in the several portions of the said spiral chamber, substantially as set forth.

Yonkers N. Y. Jan. 6th 1858.

E. GRAVES OTIS.

In presence of—
  CHAS. R. OTIS,
  NORTON P. OTIS.